Patented Dec. 30, 1924.

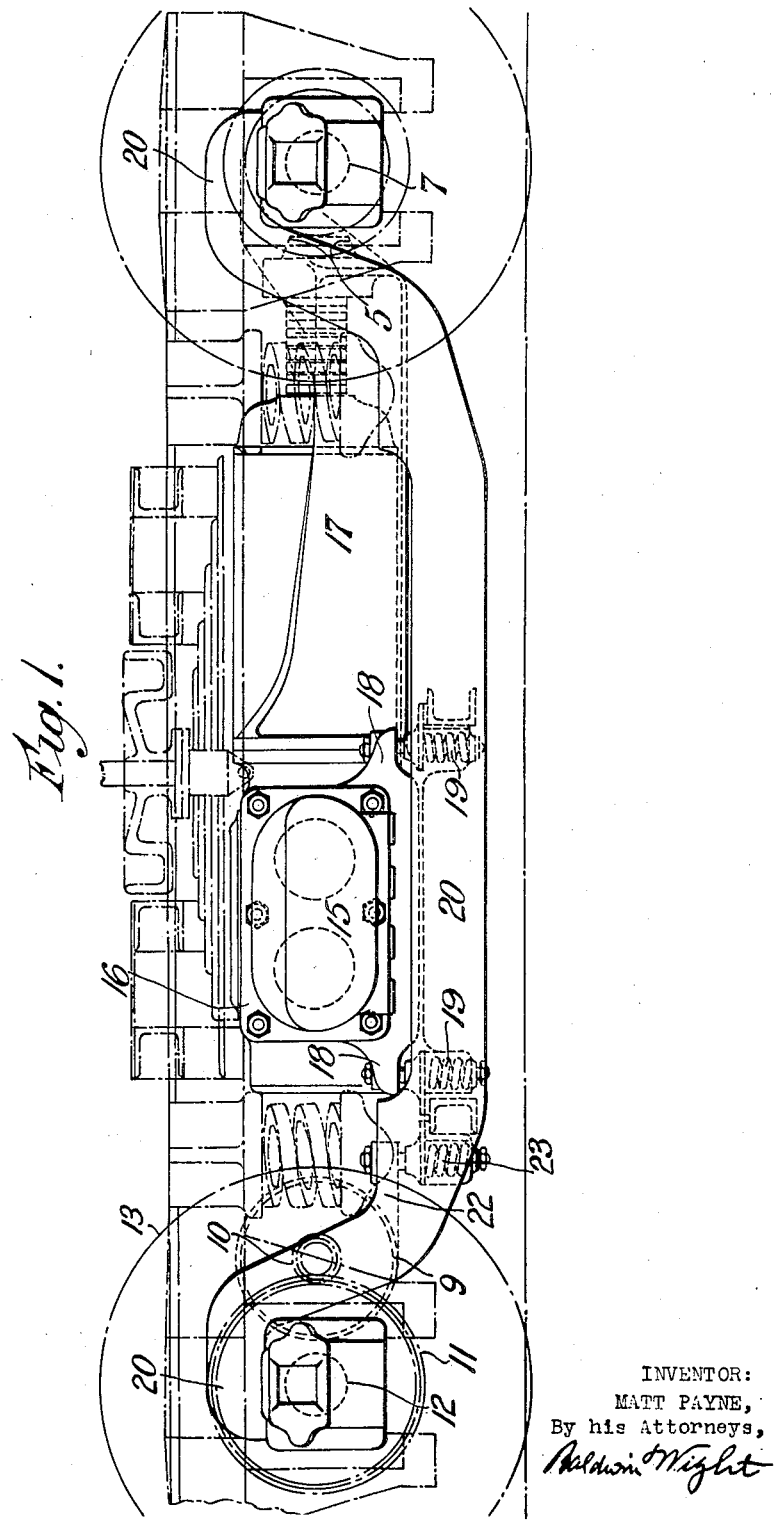

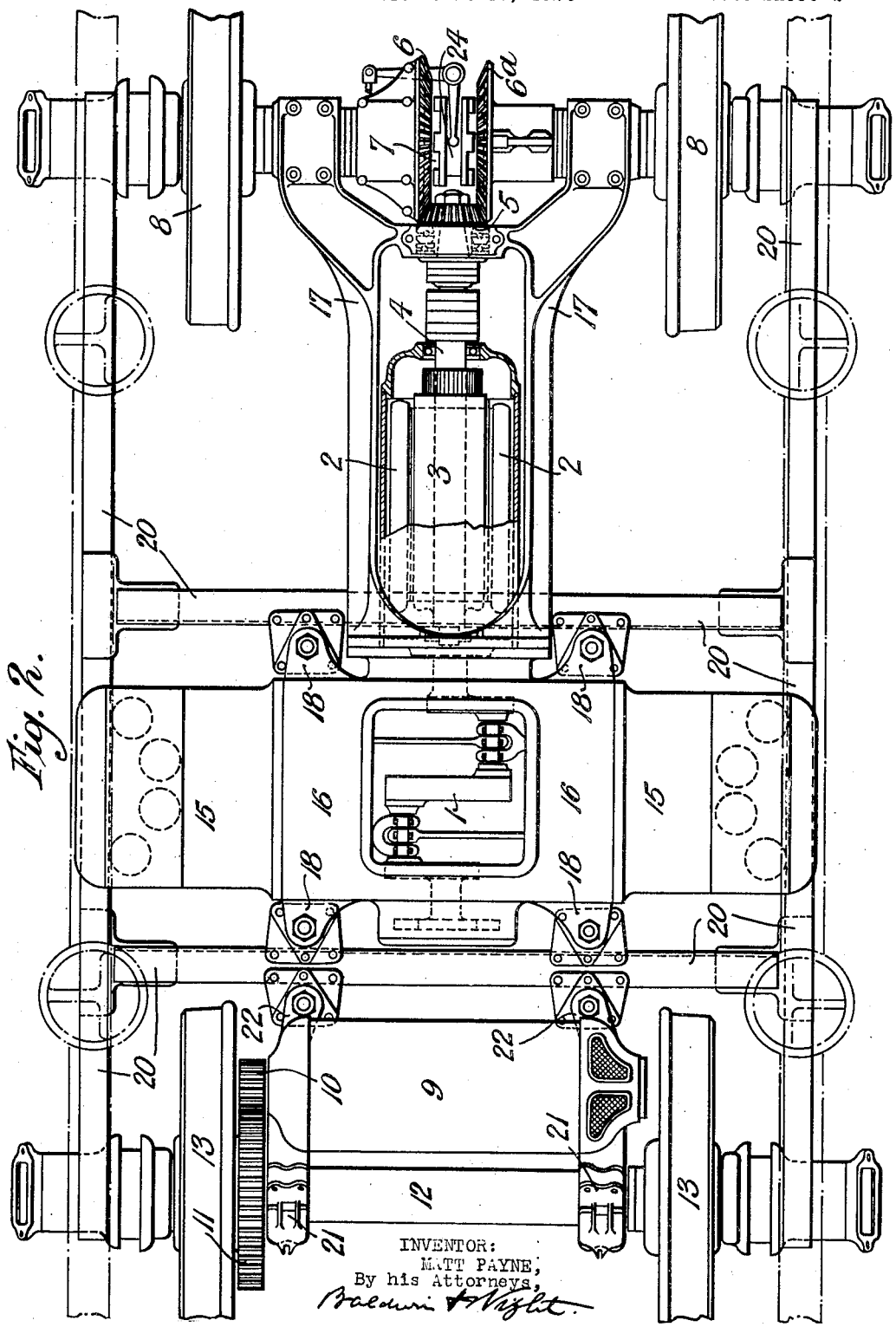

1,521,562

UNITED STATES PATENT OFFICE.

MATT PAYNE, OF LONDON, ENGLAND, ASSIGNOR OF ONE-HALF TO HOBDELL, WAY AND COMPANY, LIMITED, OF LONDON, ENGLAND.

ELECTROMAGNETIC TRANSMISSION OF POWER ON VEHICLES.

Applicaton filed June 17, 1924. Serial No. 720,668.

*To all whom it may concern:*

Be it known that I, MATT PAYNE, a subject of the King of Great Britain, residing at 45 Church Street, Minories, London, England, have invented new and useful Improvements in Electromagnetic Transmission of Power on Vehicles, of which the following is a specification.

This invention relates to improvements in that type of electromagnetic transmission of power on vehicles in which a prime mover such as an internal combustion engine transmits its power to a driven shaft through an electromagnetic clutch so constructed that when slipping of the clutch takes place current is generated and is led to an electric motor on the driven shaft whereby the torque on this latter is increased.

The object of the present invention is to provide a bogie with a self contained unit of this type.

In carrying out my invention I provide a prime mover consisting of an internal combustion engine having horizontal cylinders, preferably of the horizontally opposed type, the engine being provided with a bracket which carries the generator and is pivotally connected to one of the bogie axles, while the engine is supported by springs on a transverse member of the bogie frame. The motor supplied with current from the generator driven by the engine is pivotally connected at one side to the other axle and is supported on the other by springs on a transverse member of the bogie frame. In order that the motion of the inner member of the generator shall be able to rotate the axle, which it drives, either in a forward or reverse direction, the shaft carrying the inner member is provided with a bevel pinion meshing with a pair of bevel wheels which are rotatably mounted on the driving axle, either one of the bevel wheels being capable of being placed in engagement with the axle by means of a dog clutch which is slidably but not rotatably mounted on the axle. The frame of the bogie is preferably greatly underslung in order to enable the engine, generator, and motor to be built sufficiently low to allow the complete unit to be substituted for the bogie of an existing vehicle.

Preferably the axles of the other bogie of the vehicle are each provided with electric motors supplied with current from the generator, the motors and generator being controlled through a controller of any form by which the motors may be disconnected as the speed of the vehicle increases and the torque effort decreases. In this way at low speeds and high torque the number of driving wheels of the vehicle is increased, but at high speeds and low torque the number of driving wheels is decreased and a maximum transmission efficiency is obtained.

The accompanying drawing shows one way of carrying out my invention. Figure 1 is an elevation and Figure 2 a plan thereof.

1 is the crank shaft of a prime mover, fast with which is the outer member 2 of an electric generator. The inner member 3 of the generator is mounted on a shaft 4 provided at one end with a bevel pinion 5 in mesh with a bevel wheel 6 which latter is mounted on an axle 7 provided with driving wheels 8. Current generated by the generator is led to an electric motor 9, the armature of which is provided with a pinion 10 in mesh with a gear wheel 11, mounted on an axle 12, provided with driving wheels 13. 15 are cylinders of an horizontally opposed type of internal combustion engine, the crank case 16 of which is provided with a bracket 17 pivotally connected to the axle 7. The crank case 16 is provided with lugs 18 which are supported by springs 19 on a transverse member of the bogie frame 20. The frame of the electric motor 9 is provided with brackets 21 which are pivotally connected to the axle 12 and with lugs 22 which are supported by springs 23 on a transverse member of the bogie frame 20.

In order that the motion of the inner member 3 of the electric generator shall be able to rotate the axle 7 either in a forward or in a reverse direction, the bevel pinion 5 on the shaft 4 meshes with a pair of bevel wheels 6, 6ª, which are rotatably mounted on the axle 7 either one of which can be put into engagement therewith by means of a dog clutch 24 which is slidably but not rotatably mounted on the axle 7.

It will be seen that by employing an internal combustion engine of the horizontally opposed type and the method of supporting it and the electric motors, the bogie unit can be built very low and can consequently be substituted for the bogies of existing vehicles.

What I claim is:—

1. In a bogie the combination of an internal combustion engine having horizontal cylinders, an electro-magnetic clutch driven by the engine and forming a generator when slipping of the clutch takes place, an axle driven by said clutch, a second axle, and an electric motor driving said axle and supplied with current from the generator.

2. In a bogie the combination of an internal combustion engine having horizontally opposed cylinders, an electro-magnetic clutch driven by the engine and forming a generator when slipping of the clutch takes place, an axle driven by said clutch, a second axle, and an electric motor driving said axle and supplied with current from the generator.

3. In a bogie the combination of an internal combustion engine having horizontal cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, and an electric motor driving said axle and supplied with current from the generator.

4. In a bogie the combination of an internal combustion engine having horizontally opposed cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, and an electric motor driving said axle and supplied with current from the generator.

5. In a bogie the combination of an internal combustion engine having horizontal cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, and an electric motor driving said axle and supplied with current from the generator.

6. In a bogie the combination of an internal combustion engine having horizontally opposed cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, and an electric motor driving said axle and supplied with current from the generator.

7. In a bogie the combination of an internal combustion engine having horizontal cylinders, an electro-magnetic clutch driven by the engine and forming a generator when slipping of the clutch takes place, an axle driven by said clutch, a second axle, and an electric motor pivoted to and driving said axle and supplied with current from the generator.

8. In a bogie the combination of an internal combustion engine having horizontally opposed cylinders, an electro-magnetic clutch driven by the engine and forming a generator when slipping of the clutch takes place, an axle driven by said clutch, a second axle, and an electric motor pivoted to and driving said axle and supplied with current from the generator.

9. In a bogie the combination of an internal combustion engine having horizontal cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, and an electric motor pivoted to and driving said axle and supplied with current from the generator.

10. In a bogie the combination of an internal combustion engine having horizontally opposed cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, and an electric motor pivoted to and driving said axle and supplied with current from the generator.

11. In a bogie the combination of an internal combustion engine having horizontal cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, and an electric motor pivoted to and driving said axle and supplied with current from the generator.

12. In a bogie the combination of an internal combustion engine having horizontally opposed cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, and an electric motor pivoted to and driving said axle and supplied with current from the generator.

13. In a bogie the combination of an internal combustion engine having horizontal cylinders, an electro-magnetic clutch driven by the engine and forming a generator when slipping of the clutch takes place, an axle driven by said clutch, a second axle, an electric motor driving said axle and supplied with current from the generator, and springs interposed between the said motor and the bogie.

14. In a bogie the combination of an internal combustion engine having horizontally opposed cylinders, an electro-magnetic clutch driven by the engine and forming a generator when slipping of the clutch takes place, an axle driven by said clutch, a second axle, an electric motor driving said axle and supplied with current from the generator, and springs interposed between the said motor and the bogie.

15. In a bogie the combination of an internal combustion engine having horizontal cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, an electric motor driving said axle and supplied with current from the generator, and springs interposed between the said motor and the bogie.

16. In a bogie the combination of an internal combustion engine having horizontally opposed cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, an electric motor driving said axle and supplied with current from the generator and springs interposed between the said motor and the bogie.

17. In a bogie the combination of an internal combustion engine having horizontal cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, an electric motor driving said axle and supplied with current from the generator and springs interposed between the said motor and the bogie.

18. In a bogie the combination of an internal combustion engine having horizontally opposed cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, an electric motor driving said axle and supplied with current from the generator, and springs interposed between the said motor and the bogie.

19. In a bogie the combination of an internal combustion engine having horizontal cylinders, an electro-magnetic clutch driven by the engine and forming a generator when slipping of the clutch takes place, an axle driven by said clutch, a second axle, an electric motor pivoted to and driving said axle and supplied with current from the generator, and springs interposed between the said motor and the bogie.

20. In a bogie the combination of an internal combustion engine having horizontally opposed cylinders, an electro-magnetic clutch driven by the engine and forming a generator when slipping of the clutch takes place, an axle driven by said clutch, a second axle, an electric motor pivoted to and driving said axle and supplied with current from the generator, and springs interposed between the said motor and the bogie.

21. In a bogie the combination of an internal combustion engine having horizontal cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, an electric motor pivoted to and driving said axle and supplied with current from the generator, and springs interposed between said motor and the bogie.

22. In a bogie the combination of an internal combustion engine having horizontally opposed cylinders, an electro-magnetic clutch driven by the engine and forming a generator when slipping of the clutch takes place, an axle driven by said clutch, a bracket carrying the generator and attached at one end to the engine and pivotally mounted at the other end on the axle, a second axle, an electric motor pivoted to and driving said axle and supplied with current from the generator, and springs interposed between the said motor and the bogie.

23. In a bogie the combination of an internal combustion engine having horizontal cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, an electric motor pivoted to and driving said axle and supplied with current from the generator, and springs interposed between the said motor and the bogie.

24. In a bogie the combination of an internal combustion engine having horizontally opposed cylinders, an electro-magnetic clutch driven by the engine and forming a generator when slipping of the clutch takes place, springs interposed between the engine and the bogie, an axle driven by said clutch, a bracket carrying the generator and attached at one end to the engine and pivotally mounted at the other end on the axle, a second axle, an electric motor pivoted to and driving said axle and supplied with current from the generator, and springs interposed between the said motor and the bogie.

In testimony that I claim the foregoing as my invention I have signed my name this 26th day of May, 1924.

MATT PAYNE.